J. UNSWORTH.
SLIDE.
APPLICATION FILED JAN. 22, 1919.
1,343,598.
Patented June 15, 1920.
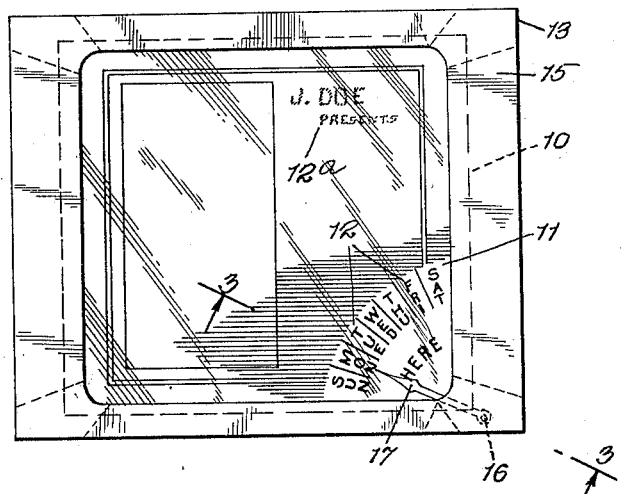
Fig.1,
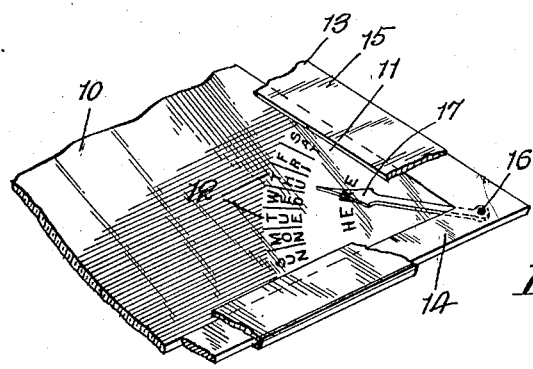
Fig.2,
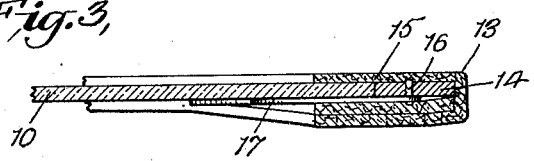
Fig.3,
INVENTOR
John Unsworth
BY his ATTORNEY
N. T. Criswell

UNITED STATES PATENT OFFICE.

JOHN UNSWORTH, OF NEW YORK, N. Y.

SLIDE.

1,343,598. Specification of Letters Patent. Patented June 15, 1920.

Application filed January 22, 1919. Serial No. 272,518.

*To all whom it may concern:*

Be it known that I, JOHN UNSWORTH, a citizen of the United States, and a resident of New York, in the county of New York and State of New York, have invented a certain new and useful Improvement in Slides, of which the following is a full, clear, and exact specification.

This invention relates more particularly to a class of lantern slides.

My invention has its object primarily to provide a slide designed to be employed especially in conjunction with moving picture projecting machines and like apparatus whereby announcements, pictures of objects and other subject matter may be displayed on the screens of moving pictures and elsewhere for the purpose of notifying the audience of approaching attractions, and which is of a form to permit the days or dates for showing the attractions to be exhibited on the screen in a novel manner. The invention resides mainly in the provision of an angular transparent plate having a dial provided thereon in proximity to one of its angles, and this plate is inclosed in a fireproof frame. To the frame is pivoted an indicating element which is disposed toward the dial so as to be manually moved indicating on the dial a day or date relating to the subject matter which is also provided on the transparent plate, the dial and pointer with the subject matter appearing on the screen in association when projected.

A further object of the invention is to provide a slide of a simple and efficient construction which may be made in any desired size and shape.

A practical embodiment of the invention is represented in the accompanying drawing forming a part of this specification in which similar characters of reference indicate corresponding parts in all the views, the said invention being more fully described hereinafter, and then pointed out in the claim at the end of the description.

In the drawing, Figure 1 is a plan of one form of slide embodying my invention.

Fig. 2 is an enlarged fragmentary view, partly broken away, showing a plan of part of the slide provided with the dial and indicating element, and Fig. 3 is an enlarged detail sectional view taken on the line 3—3 of Fig. 1.

The slide has a plate 10 which may be of any angular shape, though the plate shown is substantially rectangular; and this plate may be made of glass or other transparent material. At one corner of the transparent plate is provided a dial, as 11, which may be of any suitable design, though this dial is preferably in the form of a quadrant disposed crosswise of one corner of the plate with its curved edge being disposed toward the center of the plate. On the dial at its curved edge is provided suitable data, such as the days of the week, as 12, so that one or more of the days may be indicated in conjunction with the announcement, or picture or other subject matter, as $12^a$, which is provided on the other portion of the plate for projection on the screen of a moving picture theater and elsewhere by the use of the usual projecting machine, this slide being employed in the manner common to the use of this class of devices.

The transparent plate 10 is inclosed in a frame, as 13, which may be of any suitable type as well as being of any suitable material, though the frame is preferably made of asbestos or other substantially fireproof material. When made of asbestos the frame is formed from a sheet of this material which is of class having paperlike fabrication, such as is commonly used on steam pipes and the like to serve as a protector and non-heat conductor. The frame 13 consists of a flat mat member 14 which is of a size and shape to fit snugly the perimeter of the transparent plate 10, and this mat member may be of a thickness corresponding to the thickness of the transparent plate. On the plate 10 and on the mat member 14 is another mat member 15 which is preferably substantially U-shaped as viewed in cross section. This U-shaped mat member is arranged so that the edges of the plate 10 and the mat member 14 are disposed between the arms or legs of the member, and these legs of the U are of widths so that their free edges overlap the entire mat member 14 as well as overlapping the marginal edges of the transparent plate.

To the corner of the mat member 14 which is adjacent to the dial 11 is pivoted, at 16, one end of an indicating element, as 17. This indicating element may be of any suitable type, though it is preferably in the form of a watch hand or pointer having its dart head at or in proximity to the days or inscriptions 12 of the dial, in order to permit the indicating element or hand to be manually swung for pointing to a given day or inscription. By providing the dial 11 and the indicating element 17 at the corner of the slide the indicating element is readily accessible when the slide is in use in a moving picture projecting machine so that if desired the indicating element may be swung to more than one of the days of the dial without removing the slide from the machine, thus providing a very novel and catchy method for directing the attention of observers to the subject matter on the transparent plate when displayed on the screen of a moving picture theater and elsewhere.

In the foregoing description, I have embodied the preferred form of my invention, but I do not wish to be understood as limiting myself thereto as I am aware that modifications may be made therein without departing from the principle or sacrificing any of the advantages of this invention, therefore I reserve to myself the right to make such changes as fairly fall within the scope thereof.

Having thus described my invention, I claim as new and desire to secure by Letters Patent:—

A lantern slide comprising a substantially rectangular transparent announcement plate having a corner dial in the form of a quadrant on one face thereof, a frame for said plate, said frame including an inclosed flat rectangular mat member fitting snugly the perimeter of the transparent plate, and a pointer having one end pivoted to a corner of the mat member adjacent to and concentric with said dial, the other end of the pointer being free and disposed toward the dial.

This specification signed and witnessed this 21st day of January A. D. 1919.

JOHN UNSWORTH

Witnesses:
J. FREDERICK CRYER,
D. KOEPER.